US012704745B2

(12) United States Patent
Li et al.

(10) Patent No.: US 12,704,745 B2
(45) Date of Patent: Aug. 11, 2026

(54) CONNECTING STRUCTURE AND WEARABLE ELECTRONIC DEVICE

(71) Applicant: Beijing Youzhuju Network Technology Co., Ltd., Beijing (CN)

(72) Inventors: Fuxuan Li, Beijing (CN); Wu Han, Beijing (CN)

(73) Assignee: BEIJING YOUZHUJU NETWORK TECHNOLOGY CO., LTD., Beijing (CN)

( * ) Notice: Subject to any disclaimer, the term of this patent is extended or adjusted under 35 U.S.C. 154(b) by 225 days.

(21) Appl. No.: 18/573,577

(22) PCT Filed: Aug. 30, 2022

(86) PCT No.: PCT/CN2022/115759
§ 371 (c)(1),
(2) Date: Dec. 22, 2023

(87) PCT Pub. No.: WO2023/045718
PCT Pub. Date: Mar. 30, 2023

(65) Prior Publication Data

US 2024/0302680 A1 Sep. 12, 2024

(30) Foreign Application Priority Data

Sep. 26, 2021 (CN) .......................... 202111128323.5

(51) Int. Cl.
*G02C 5/22* (2006.01)
*G02B 27/01* (2006.01)
*G02C 11/00* (2006.01)

(52) U.S. Cl.
CPC ................ *G02C 5/22* (2013.01); *G02C 11/10* (2013.01); *G02B 2027/0178* (2013.01); *G02C 5/2209* (2013.01)

(58) Field of Classification Search
CPC ........ G02C 5/22; G02C 11/10; G02C 5/2209; G02B 2027/0178
See application file for complete search history.

(56) References Cited

U.S. PATENT DOCUMENTS

| | | | | |
|---|---|---|---|---|
| 6,163,926 A * | 12/2000 | Watanabe | G02C 5/22 | 351/153 |
| 2005/0046790 A1* | 3/2005 | Jannard | G02C 11/10 | 351/158 |
| 2014/0049895 A1* | 2/2014 | Lee | H01R 12/79 | 361/679.28 |

FOREIGN PATENT DOCUMENTS

| | | |
|---|---|---|
| CN | 101888761 A | 11/2010 |
| CN | 111552084 A | 8/2020 |

(Continued)

OTHER PUBLICATIONS

International Search Report (with English translation) and Written Opinion issued in PCT/CN2022/115759, dated Oct. 28, 2022, 8 pages provided.

(Continued)

*Primary Examiner* — George G. King
(74) *Attorney, Agent, or Firm* — Astute IP Law Group

(57) ABSTRACT

The disclosure provides a connecting structure and a wearable electronic device. The connecting structure includes: a first component having a first accommodating space and a first shaft hole in communication with each other; a second component having a second accommodating space and a second shaft hole in communication with each other; a rotating shaft inserted into the first and second shaft holes, the first and second components being rotatably connected by the rotating shaft, a first end of the rotating shaft being located inside the first component, the rotating shaft having a cavity opened on an end face of the first end and in communication with the first accommodating space, a side (Continued)

wall of the rotating shaft has a first opening in communication with the cavity and the second accommodating space; a transmission component having an end fixed in the second accommodating space and the other end extending from the second accommodating space to the first accommodating space through the first opening and the cavity and fixed in the first accommodating space.

18 Claims, 5 Drawing Sheets

(56) References Cited

FOREIGN PATENT DOCUMENTS

| | | | |
|---|---|---|---|
| CN | 211169344 | U | 8/2020 |
| CN | 111665632 | A | 9/2020 |
| CN | 111665633 | A | 9/2020 |
| CN | 111665635 | A | 9/2020 |
| CN | 212207859 | U | 12/2020 |
| CN | 112485959 | A | 3/2021 |

OTHER PUBLICATIONS

Office Action for Chinese Patent Application No. 202111128323.5, mailed on Mar. 28, 2026, 14 pages.

* cited by examiner

CONNECTING STRUCTURE AND WEARABLE ELECTRONIC DEVICE

CROSS REFERENCE

This application is based on Chinese Patent Application No. 202111128323.5, filed on Sep. 26, 2021, and entitled "connecting structure and wearable electronic device", and claims priority to the Chinese Patent Application. The entirety of the above-mentioned Chinese Patent Application is incorporated herein by reference.

FIELD

The present disclosure relates to the field of mechanical structures, and more particularly to a connecting structure and a wearable electronic device.

BACKGROUND

With development of information technology and popularity of virtual reality and augmented reality technology, more and more eyeglasses are provided with electronic devices, which brings a better visual experience to people. The electronic devices are usually configured in an eyeglass frame and a leg of the eyeglass, so transmission cables are needed to connect the electronic devices in the eyeglass frame and leg. Some technologies set the cables outside the eyeglass, which leads the cables to be exposed, such that the cables are prone to be damaged and water ingress.

SUMMARY

The present disclosure provides a connecting structure and a wearable electronic device.

The present disclosure adopts the following technical solutions.

In some embodiments, the present disclosure provides a connecting structure comprising:

- a first component having a first accommodating space and a first shaft hole in communication with each other;
- a second component having a second accommodating space and a second shaft hole in communication with each other;
- a rotating shaft inserted into the first and the second shaft holes, the first and second components being rotatably connected by the rotating shaft, a first end of the rotating shaft being located inside the first component, the rotating shaft having a cavity opened on an end face of the first end and in communication with the first accommodating space, and a side wall of the rotating shaft having a first opening in communication with the cavity and the second accommodating space;
- a transmission component having an end fixed in the second accommodating space and the other end extending from the second accommodating space to the first accommodating space through the first opening and the cavity and fixed in the first accommodating space.

In some embodiments, the present disclosure provides a wearable electronic device, comprising a connecting structure according to any one of the present disclosure: in some embodiments, the wearable electronic device may be an eyeglass-type electronic device, the first component is an eyeglass leg of an eyeglass, the second component is an eyeglass frame of the eyeglass.

The embodiments of the present disclosure provide a connecting structure comprising: a first component having a first accommodating space and a first shaft hole in communication with each other; a second component having a second accommodating space and a second shaft hole in communication with each other: a rotating shaft inserted into the first shaft hole and the second shaft hole, the first component and the second component being rotatably connected by the rotating shaft, a first end of the rotating shaft being located inside the first component, the rotating shaft having a cavity opened on an end face of the first end and in communication with the first accommodating space, a side wall of the rotating shaft has a first opening in communication with the cavity and the second accommodating space; a transmission component having an end fixed in the second accommodating space and the other end extending from the second accommodating space to the first accommodating space through the first opening and the cavity and fixed in the first accommodating space: in some embodiments, when the first component rotates relative to the second component, the second component is stationary relative to the rotating shaft, and the first component rotates relative to the rotating shaft. The present disclosure can improve connection tightness and waterproofness.

BRIEF DESCRIPTION OF THE DRAWINGS

In conjunction with the accompanying drawings and with reference to the following detailed description, the above and other features, advantages and aspects of various embodiments of the present disclosure will become more apparent. Throughout the drawings, like or similar reference numerals denote like or similar elements. It should be understood that the drawings are illustrative and elements and elements are not necessarily drawn to scale.

LABELS IN THE FIGURES

Figure 1:
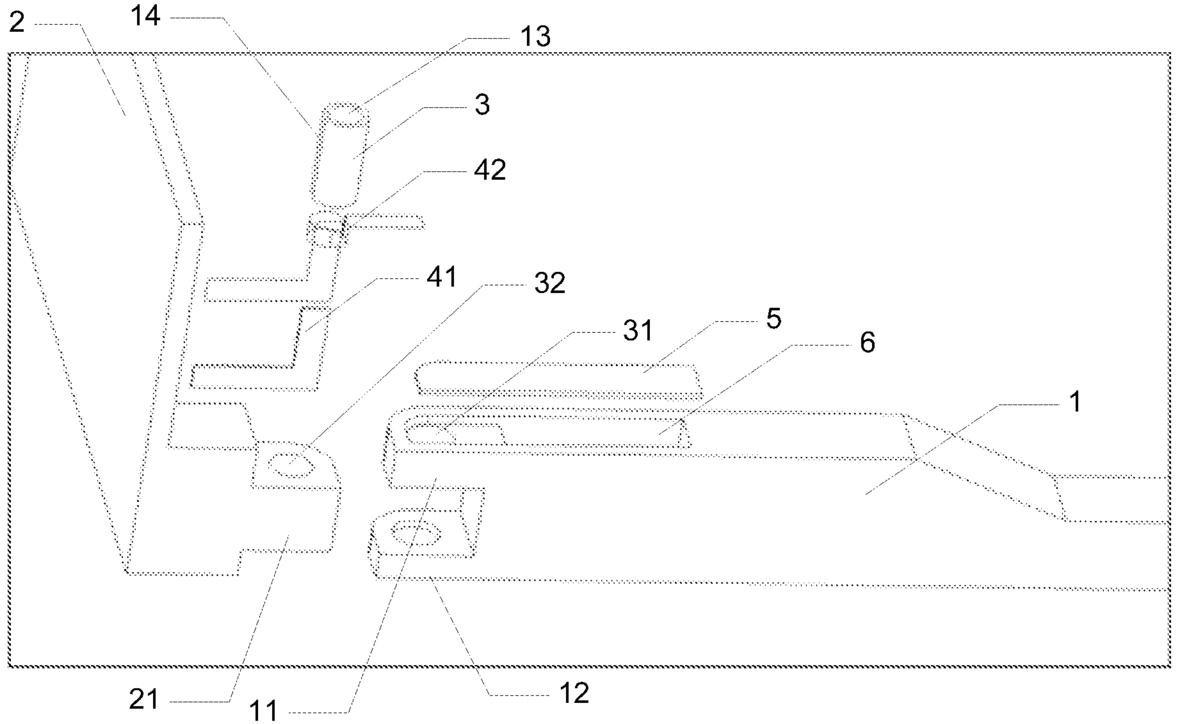
FIG. 1 is an exploded view of connecting structure of an embodiment of the present disclosure.
Figure 2:
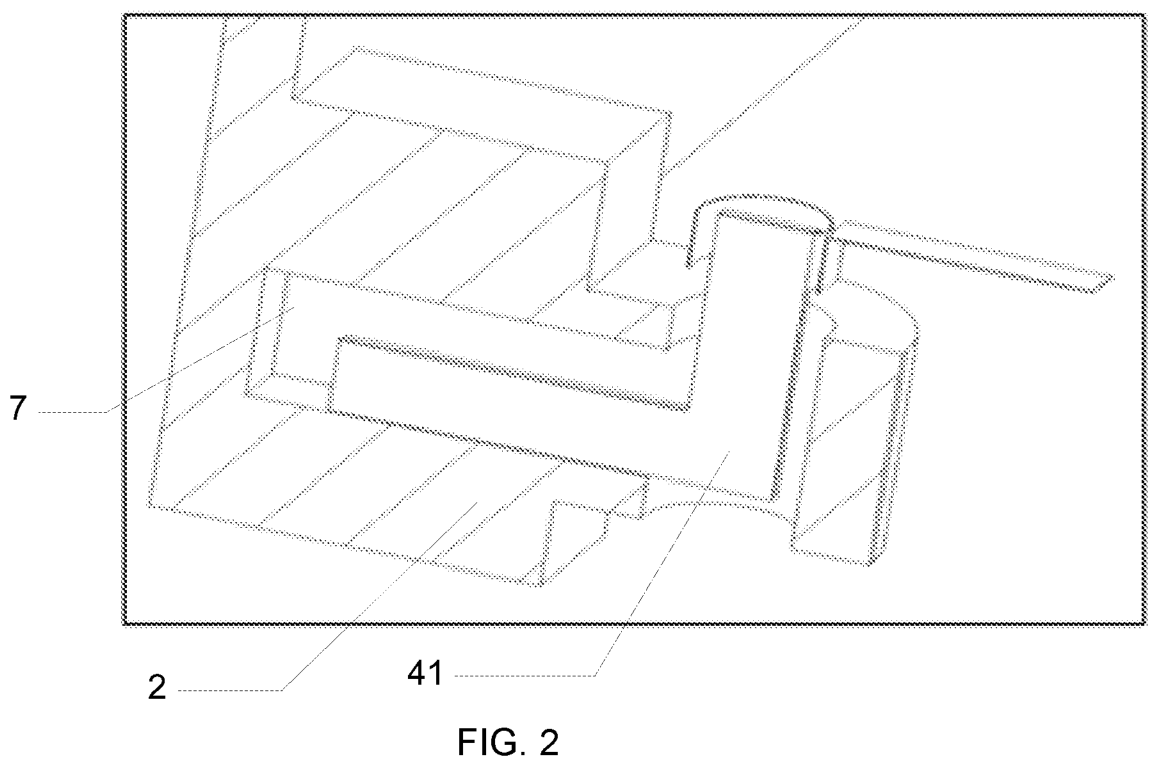
FIG. 2 is a cross-sectional view of a second component in a connecting structure of an embodiment of the present disclosure.
Figure 3:
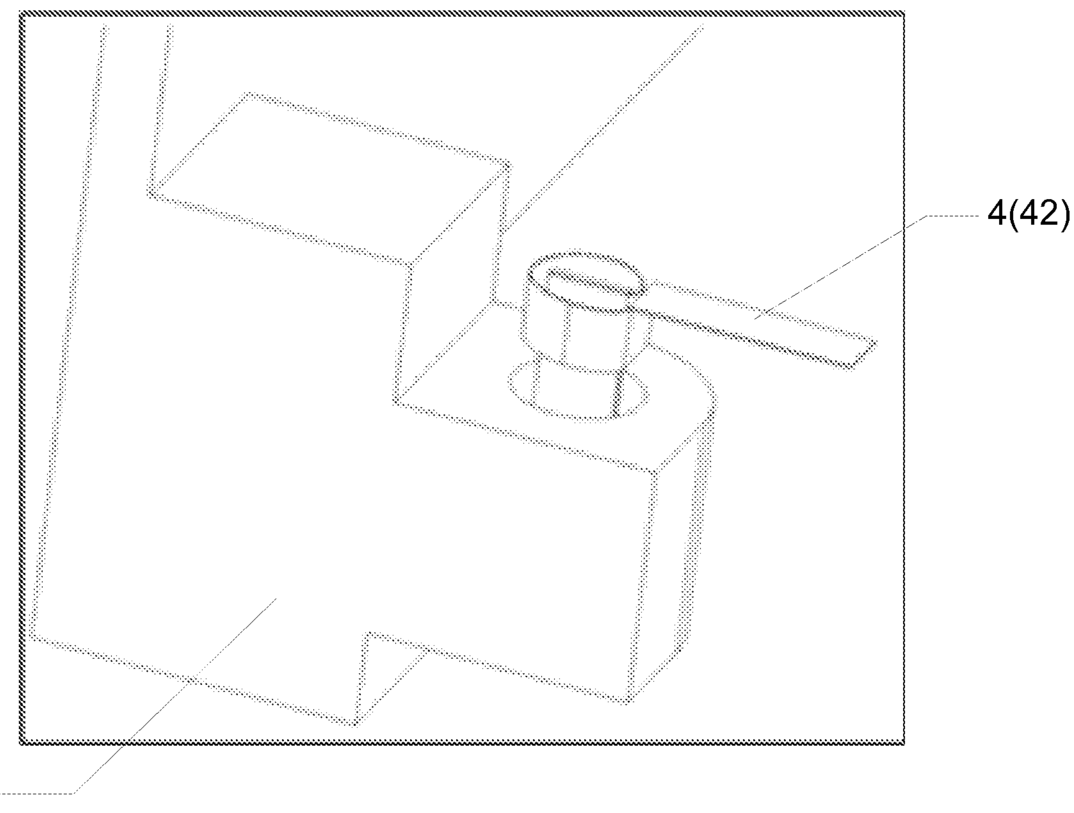
FIG. 3 is a partial schematic view of a connecting structure of an embodiment of the present disclosure.

1. First component; 11. First protrusion; 12. Second protrusion; 13. Cavity; 14. First opening; 2. Second component; 21. Third protrusion; 3. Rotating shaft; 31. First shaft hole; 32. Second shaft hole; 4. Transmission component; 41. Circuit bracket; 42. Flexible circuit; 5. Capping component; 6. First accommodating space; 7. Second accommodating space.

DETAILED DESCRIPTION

Embodiments of the present disclosure will be described hereafter in more detail with reference to the accompanying drawings. Although certain embodiments of the present disclosure are shown in the drawings, it should be understood that the present disclosure can be implemented in various forms and should not be construed as limited to the embodiments set forth herein. On the contrary, these embodiments are provided for a more thorough and complete understanding of the present disclosure. It should be understood that the drawings and embodiments of the present disclosure are for illustrative purposes only and are not intended to limit the scope of protection of the present disclosure.

It should be understood that various steps recited in method implementations of the present disclosure can be executed in sequence and/or in parallel. In addition, the method implementations can include additional steps and/or omit the steps shown. The scope of the present disclosure is not limited in this regard.

The term "including" and its variations used herein are open-ended inclusion. i.e. "including but not limited to". The term "based on" means "at least partially based on". The term "an embodiment" means "at least one embodiment": the term "another embodiment" means "at least one additional embodiment"; and the term "some embodiments" means "at least some embodiments". Relevant definitions of other terms will be given in the following description.

It should be noted that the concepts of "first" and "second" mentioned in the present disclosure are only used to distinguish different devices, modules, or units, and are not used to limit the order or interdependence of the functions performed by these devices, modules, or units.

It should be noted that the modification of "one" mentioned in the present disclosure is illustrative and not restrictive. Those skilled in the art should understand it as "one or more" unless otherwise specified in the context.

The names of the messages or information exchanged between multiple devices in implementations of the present disclosure are for illustrative purposes only and are not intended to limit the scope of these messages or information.

Embodiments of the present disclosure will be described herein in detail in conjunction with the accompanying drawings.

Referring to FIGS. 1 to 8, some embodiments of the present disclosure present a connecting structure including: a first component 1, a second component 2, a rotating shaft 3 and a transmission component 4. As shown in FIG. 1, the first component 1 has a first accommodating space 6 and a first shaft hole 31 in communication with each other, the first accommodating space 6 is located inside the first component 1, the second component 2 has a second accommodating space 7 and a second shaft hole 32 in communication with each other, the second accommodating space 7 is located inside the second component 2: the first accommodating space 6 may be a groove, the first shaft hole may be disposed on a side of the first accommodating space near the second shaft hole 32, an end opening of the first shaft hole 31 may be aligned with the first accommodating space 6, the other end opening of the first shaft hole 31 may be aligned with an end opening of the second shaft hole 32: the second accommodating space 7 (see FIG. 5) may be in communication with a side wall surface of the second shaft hole 32. The rotating shaft 3 is inserted into the first shaft hole 31 and the second shaft hole 32, and the first component 1 and the second component 2 are rotatably connected through the rotating shaft 3. The first end of the rotating shaft 3 is located inside the first component 1, for example, the first end of the rotating shaft 3 may be located inside the first shaft hole 31. The first end of the rotating shaft 3 may extend through the first shaft hole 31 into the first accommodating space 6. The rotating shaft has a cavity 13 that is opened on an end face of the first end and in communication with the first accommodating space 6. The side wall of the rotating shaft 3 has a first opening 14 that is in communication with the cavity 13 and the second accommodating space 7. The first opening 14 may be a region that is in communication with the second accommodating space 7 on an inner wall surface facing the second shaft hole 32. The first accommodating space 6, the cavity 13, the first opening 14, and the second accommodating space 7 are in communication with each other: the transmission component 4 may be a transmission cable, may be a power line, an end of the transmission component 4 is fixed to the second accommodating space 7, the other end extends from the second accommodating space 7 to the first accommodating space 6 through the first opening 14 and the cavity 13 and fixed in the first accommodating space 6.

In some embodiments of the present disclosure, when the first component 1 rotates relative to the second component 2, the second component 2 is stationary relative to the rotating shaft 3, the first component 1 rotates relative to the rotating shaft 3. Since the rotating shaft 3 is stationary relative to the second component 2, the rotating shaft 3 and the second component 2 will not produce compression pulling, which causes the transmission component 4 to break, on the transmission component 4, since the cavity 13 is located at an end face of the first end, extending out of the end face to the first accommodating space 6, and therefore will not compress the transmission component 4, the transmission component 4 is located inside the first component 1 and the second component 2, is not exposed to the outside, and does not hinder relative rotation of the first component 1 and the second component 2, which can protect the transmission component 4 while improving an appearance of the connecting component.

In some embodiments of the present disclosure, the rotating shaft 3 is in interference fit with the second shaft hole 32, the rotating shaft 3 is in clearance fit with the first shaft hole 31. In some embodiments, an outer diameter of the rotating shaft 3 is slightly larger than an inner diameter of the second shaft hole 32, thus there is a pressing force between the rotating shaft 3 and the second component 2, so that the relative position between the second component 2 and the rotating shaft 3 remains unchanged, and the relative position between the rotating shaft 3 and the first component 1 can be changed.

Figure 4:
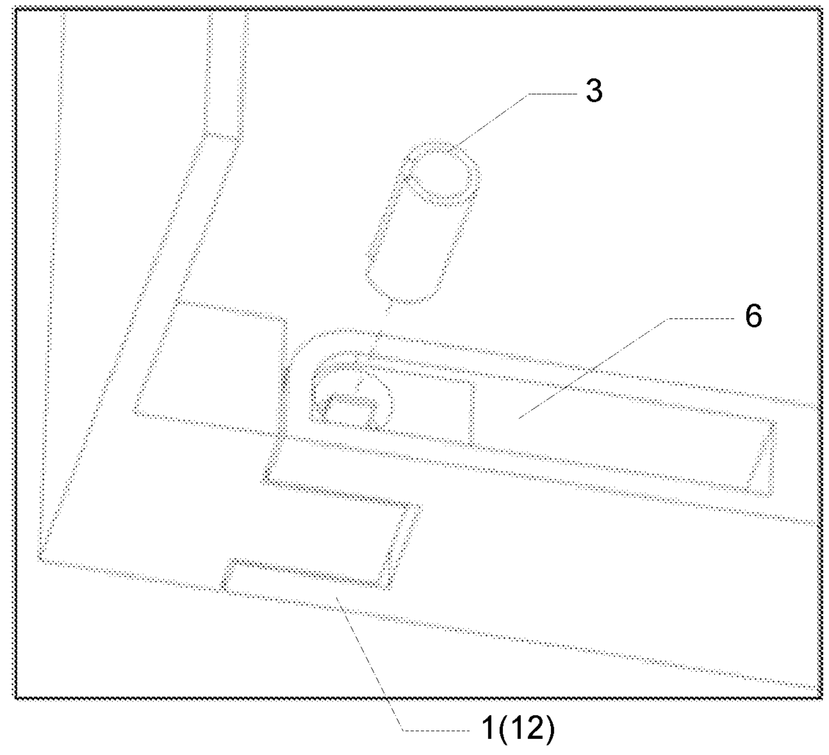
FIG. 4 is a schematic connecting position view of a rotating shaft of a connecting structure of an embodiment of the present disclosure.
Figure 5:
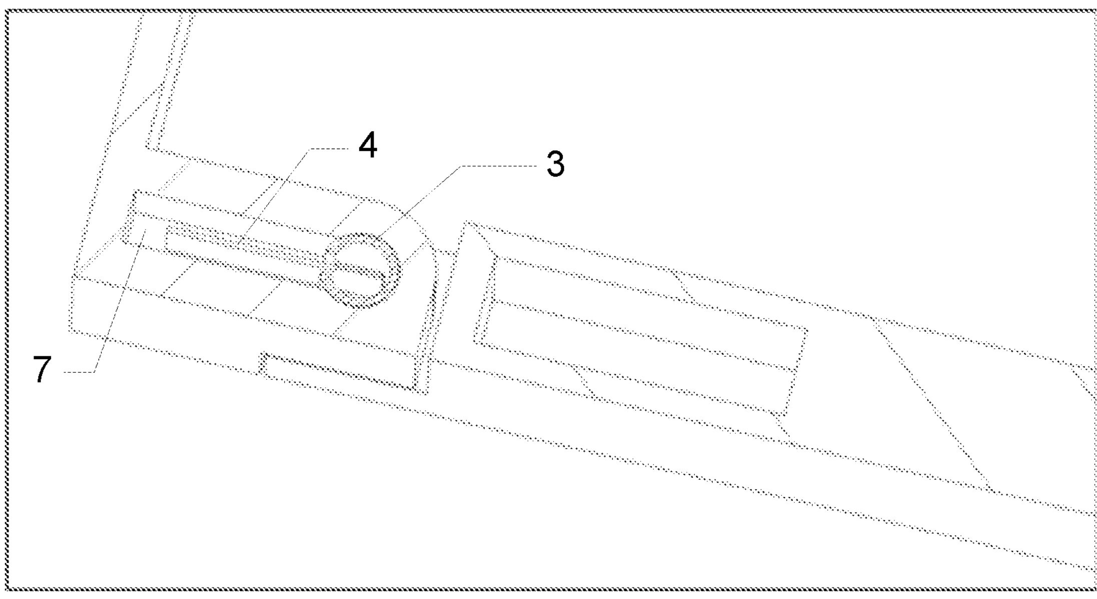
FIG. 5 is a cross-sectional view of a second component of a connecting structure of an embodiment of the present disclosure.
Figure 7:
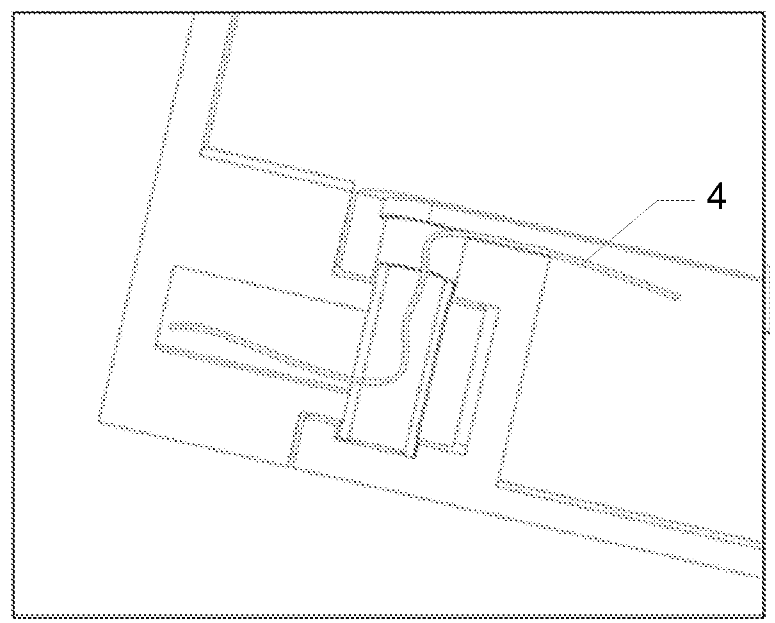
FIG. 7 is a schematic view of a connecting structure of an embodiment of the present disclosure.
Figure 8:
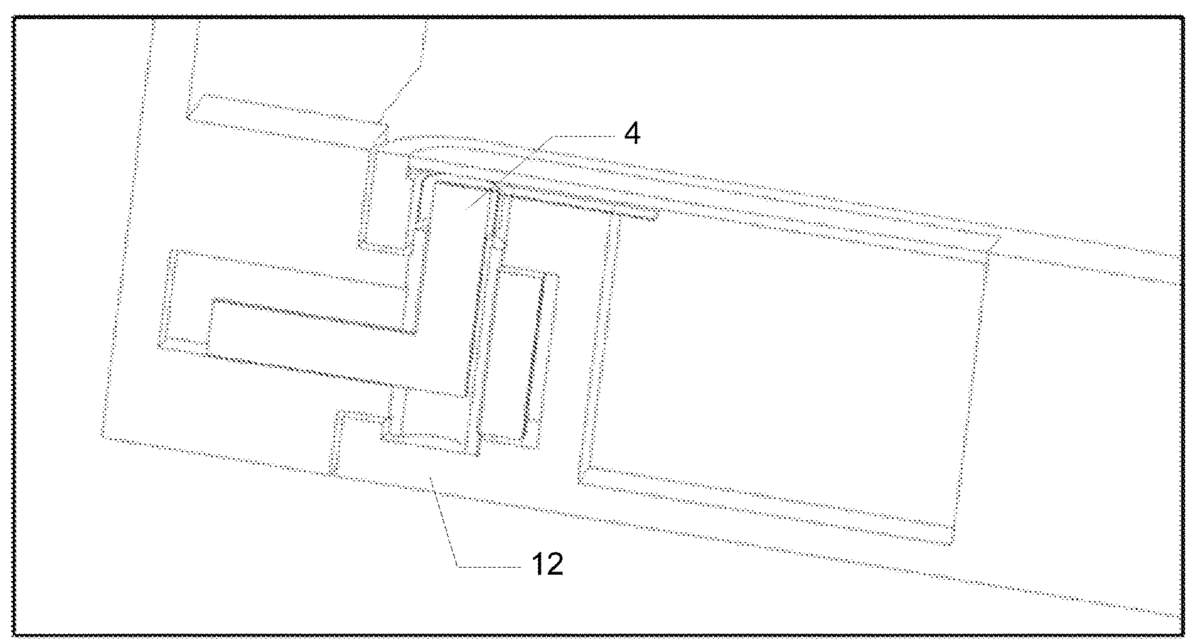
FIG. 8 is an internal schematic view of a connecting structure of an embodiment of the present disclosure.

In some embodiments of the present disclosure, referring to FIGS. 1, 4 and 7, the first component 1 includes a concave structure having a first protrusion 11 and a second protrusion 12 spaced apart, the first shaft hole 31 is located in the first protrusion 11, a side of the second protrusion 12 toward the first protrusion 11 has a concave hole: the second component has a third protrusion 21, the second shaft hole 32 is a through hole located in the third protrusion 21, the third protrusion 21 is located between the first protrusion 11 and the second protrusion 12, the first end of the rotating shaft 3 is located inside the first protrusion 11, the second end of the rotating shaft 3 is located inside the concave hole of the second protrusion 12. In some embodiments, the first protrusion 11 and the second protrusion 12 cooperate with the third protrusion 21, the third protrusion 21 is inserted into a gap between the first protrusion 11 and the second protrusion 12, the thickness of the third protrusion 21 may be slightly larger than the gap distance between the first protrusion 11 and the second protrusion 12, thereby forming an interference fit, increasing the tightness and waterproof level. The first shaft hole 31, the second shaft hole 32 and the concave hole are aligned with each other. The rotating shaft 3 is inserted into the first shaft hole 31, the second shaft hole 32 and the concave hole, thereby connecting the first protrusion 11, the second protrusion 12 and the third protrusion 21, since the concave hole does not penetrate the second protrusion 12, the tightness can be ensured.

In some embodiments of the present disclosure, the first component 1 and the second component 2 each have an electronic device. The electronic device in the first component 1 is communicatively connected to the electronic component in the second component 2 through the transmission component 4. In some embodiments, the electronic components in the first component 1 and the second component 2 are connected through the transmission component 4, and the transmission component 4 is not exposed to the outside, so that the waterproof level of the connecting structure can be improved, the appearance can be improved, and a risk of failure such as water seepage and damage that may be caused by exposure of the transmission component can be avoided.

In some embodiments of the present disclosure, referring to FIG. 1, the cavity 13 is a through hole running through the first and second ends of the rotating shaft 3, the cavity 13 may extend along an axial direction of the rotating shaft 3, thereby running through the end faces of both ends of the rotating shaft in the axial direction. In some embodiments, the first opening 14 is a slot extending from the first end of the rotating shaft 3 to the second end of the rotating shaft 3. The cavity 13 may extend along the axial direction of the rotating shaft 3 so as to extend from the first end of the rotating shaft to the second end of the rotating shaft. Since the cavity 13 is a through hole, the first opening 14 extends from the first end of the rotating shaft 3 to the second end, it is possible to facilitate the installation of the transmission component 4 and improve the tolerance for installation errors.

In some embodiments of the present disclosure, the transmission component 4 includes a transmission cable or a flexible circuit assembly. In some embodiments, as shown in FIG. 7, the transmission component 4 may be a transmission cable, the transmission cable may be a flexible cable, to prevent breakage. As shown in FIG. 1, the transmission component 4 may be a flexible circuit.

In some embodiments of the present disclosure, shown in FIG. 1, the flexible circuit assembly including a circuit bracket 41 and a flexible circuit 42: the circuit bracket 41 may be L-shaped, the circuit bracket 41 includes a first bracket segment and a second bracket segment connected to each other, and extending directions of the first bracket segment and the second bracket segment intersect. The first bracket segment is located within the cavity 13, may extend along the axial direction of the rotating shaft 3, the second bracket segment extends from the cavity 13 into the second accommodating space 7, the second bracket segment may extend along a radial direction of the rotating shaft. The second accommodating space may be in communication with the wall of the second shaft hole 32. The first opening 14 faces toward the second accommodating space: the flexible circuit 42 is fixed on the circuit bracket 41, extends from the first accommodating space 6 to the second accommodating space 7. The circuit bracket 41 may be made of a rigid material, which can play a role in supporting and protecting the flexible circuit 42.

In some embodiments of the present disclosure, a portion of the flexible circuit 42 located outside the rotating shaft 3 and inside the first component 1 extends into the first accommodating space 6 after surrounding at least one circle about the axial direction of the rotating shaft 3. In some embodiments, referring to FIGS. 1, 2, 3, and 6, a portion of the flexible circuit 42 extending out of the rotating shaft 3 is a curved portion, and the curved portion extends to the first accommodating space 6 after rotating one circle about the axial direction of the rotating shaft 3, so that when the first component 1 rotates relative to the second component 2, the curved portion unfolds or tightens. In some embodiments, the first component 1 rotates relative to the second component 2 between a first position and a second position. When the first component 1 is in the first position, the curved portion tightens, and when the first component 1 is in the second position, the curved portion expands. The flexible circuit is relatively sensitive to folding and torsional deformation. If the bending manner is not used, the flexible circuit may produce creases or torsional deformation, which may easily cause lines of the flexible circuit to be twisted off. By way of surrounding, the portion of the flexible circuit located inside the rotating shaft 3 does not twist, but the flexible circuit undergoes corresponding deformation in case of the relative rotation of the first component 1 and the second component 2 by tightening and expanding the portion of the flexible circuit located outside the rotating shaft 3, thereby avoiding the damage to the flexible circuit when the first component 1 and the second component 2 rotate relative to each other, ensuring normal signal transmission without the risk of twisting off the flexible circuit. For example, when the connecting component is a connecting component of an eyeglass, the first component 1 can be an eyeglass leg, the first position can be a storage position of the eyeglass leg when the eyeglass is retracted, and the second position can be an expanding position of the eyeglass leg when the eyeglass is used. By way of surrounding the rotating shaft 3 at least one circle, it can ensure that the transmission component 4 will not be damaged when the eyeglass leg is expanded and retracted.

In some embodiments of the present disclosure, the surface of the first component 1 is concaved to form the first accommodating space 6, and the first shaft hole 31 is located on the concave bottom surface of the first accommodating space 6. The connecting structure further includes a capping component 5, and the capping component 5 is used to seal the first accommodating space 6. The capping component 5 can be a cover provided at the opening of the first accommodating space 6 to seal the first accommodating space. Since the first shaft hole 31 is located on the concave bottom surface, it is convenient to process the first component 1 to form the first shaft hole.

Some embodiments of the present disclosure also provide a wearable electronic device, which may be an eyeglass-type electronic device, including a connecting structure according to any one of the present disclosure: wherein, in some embodiments, the wearable electronic device is an electronic eyeglass, the first component 1 is an eyeglass leg of the eyeglass, the second component 2 is an eyeglass frame of the eyeglass.

Figure 6:
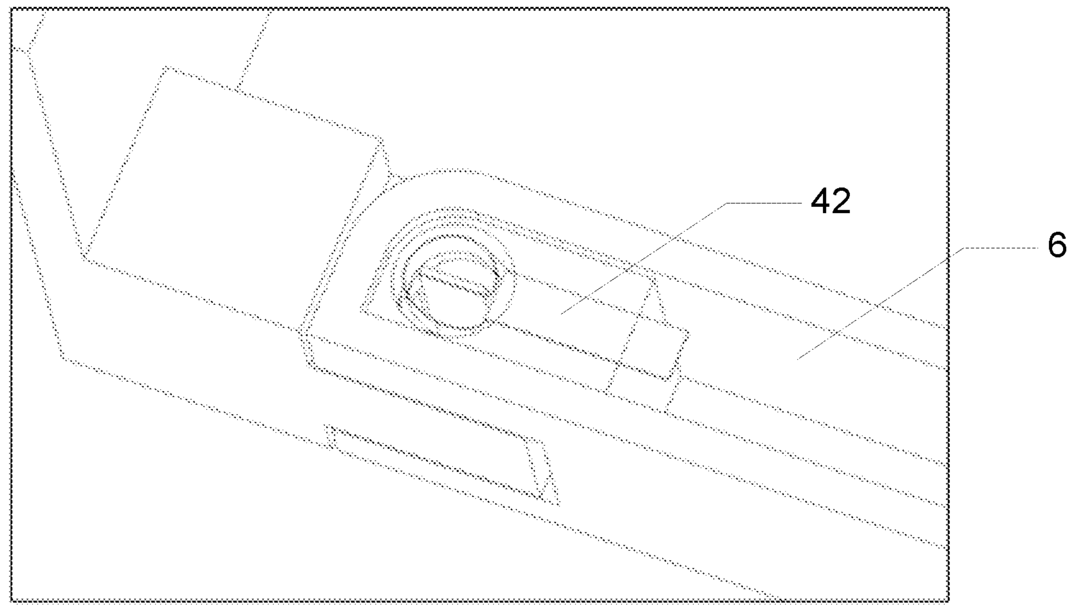
FIG. 6 is a partial schematic view of a connecting structure of an embodiment of the present disclosure.

In order to better illustrate the embodiments of the present disclosure, a specific embodiment is presented below. In this embodiment, an eyeglass-type electronic device is presented, the first component 1 is the eyeglass leg of the eyeglass, and the second component 2 is the eyeglass frame of the eyeglass. As shown in FIGS. 1 to 8, the flexible circuit 42 (such as a flexible circuit board) is fixed on the circuit bracket 41. The second component 2 has a third protrusion 21, and the third protrusion 21 has a second shaft hole 32 running through the third protrusion 21. The side wall of the second shaft hole 32 has an opening so as to be in communication with the second accommodating space 7 inside the second component 2. The first bracket segment and the second bracket segment of the circuit bracket 41 are connected to each other to form an L shape. The first bracket segment is inserted into the cavity 13 of the rotating shaft 3, and the second bracket segment extends from the first opening and is inserted into the opening on the inner wall surface of the second shaft hole 32 to extend into the second accommodating space. An end of the flexible circuit 42 is fixed in the second accommodating space 7, so that it can be connected to the electronic device in the second component 2. Sealant may be provided in the second accommodating space, thereby fixing the flexible circuit 42 and the circuit bracket 41 and improving tightness. The circuit bracket may be of a stiffness material, so that the position of the flexible circuit in the rotating shaft remains relatively fixed. The first component 1 has a concave structure. A side of a first protrusion 11 of the concave structure away from the second protrusion 12 has a groove. A groove bottom surface of the groove is provided with a first shaft hole 31 running through the first protrusion 11. A side of the second protrusion 12 facing the first protrusion 11 is concaved to form a concave hole. The concave hole does not run through the second protrusion 12. The third protrusion 21 is inserted into the space between the first protrusion 11 and the second protrusion 12. The rotating shaft 3 has a cavity 13 running through in the axial direction and a first opening 14 communicating the inside and outside of the rotating shaft 3 on the side wall. The rotating shaft 3 passes through the first shaft hole 31, the second shaft hole 32, and the concave hole, thereby realizing the rotatable connection of the first component 1 and the second component 2. The second bracket segment and the flexible circuit fixed to the second bracket segment are inserted into the second accommodating space 7 through the first opening 14. A first fixed segment extends along the axial direction within the cavity 13 of the rotating shaft 3. The rotating shaft 3 is in interference fit with the second component 2, so the rotating shaft 3 remains stationary relative to the second component 2. The rotating shaft 3 is in clearance fit with the first component 1, so that the first component 1 can rotate relative to the rotating shaft 3. As shown in FIG. 6, the flexible circuit 42 is located outside the rotating shaft 3, and a portion extending out of the first shaft hole 31 to the first accommodating space 6 surrounds the axial direction of the rotating shaft 3 to form a surrounding portion, and then is connected to the electronic device in the first accommodating space 6. When the eyeglass leg of the first component 1 is retracted, the surrounding portion of the flexible circuit tightens. When the eyeglass leg is opened, the surrounding portion of the flexible circuit expands, so that the portion of the flexible circuit inside the rotating shaft 3 will not feel the torsional force generated by the rotation of the first component 1, and will not be damaged, thereby ensuring the connection. The capping component 5 closes the opening of the first accommodating space 6. It can be sealed by way of sealant or welding.

In embodiments of the present disclosure, the rotating shaft 3 has a cavity 13 and a first opening 14, thereby reserving a space for the transmission component 4 to pass through, avoiding exposure of the transmission component 4 to the outside. When the first component 1 rotates relative to the second component 2, the flexible circuit avoids torsional force by tightening and expanding manner. The structure presented by the present disclosure has a high tightness and waterproofness and can protect the circuit and electronic devices well.

The above description is only the preferred embodiment of the present disclosure and an explanation of the technical principles used. Those skilled in the art should understand that the scope of the disclosure involved in the present disclosure is not limited to the specific combination of the technical features of the above technical solutions, but should also cover other technical solutions formed by any combination of the above technical features or equivalent features without departing from the above disclosure concept. For example, the technical solutions formed by replacing the above features with (but not limited to) technical features with similar functions disclosed in the present disclosure.

In addition, although the operations are depicted in a specific order, this should not be understood as requiring these operations to be performed in the specific order shown or in a sequential order. Under certain circumstances, multitasking and parallel processing may be advantageous. Similarly, although several specific implementation details are included in the above discussion, these should not be construed as limiting the scope of the present disclosure. Certain features described in the context of individual embodiments may also be implemented in combination in a single embodiment. Conversely, various features described in the context of a single embodiment may also be implemented in multiple embodiments individually or in any suitable subcombination.

Although the subject matter has been described in language specific to structural features and/or methodological logical acts, it should be understood that the subject matter defined in the appended claims is not necessarily limited to the particular features or acts described above. Rather, the particular features and acts described above are merely exemplary forms of implementation of the claims.

We claim:

1. A connecting structure, comprising:

a first component having a first accommodating space and a first shaft hole in communication with each other;

a second component having a second accommodating space and a second shaft hole in communication with each other;

a rotating shaft inserted into the first shaft hole and the second shaft hole, the first component and the second component being rotatably connected by the rotating shaft, a first end of the rotating shaft being located inside the first component, the rotating shaft having a cavity opened on an end face of the first end and in communication with the first accommodating space, a side wall of the rotating shaft having a first opening in communication with the cavity and the second accommodating space;

a transmission component having an end fixed in the second accommodating space and the other end extending from the second accommodating space to the first accommodating space through the first opening and the cavity and fixed in the first accommodating space;

wherein the first opening is a slot extending from the first end of the rotating shaft to a second end of the rotating shaft.

2. The connecting structure of claim 1, wherein, the rotating shaft is in interference fit with the second shaft hole, and the rotating shaft is in clearance fit with the first shaft hole.

3. The connecting structure of claim 1, wherein, the first component comprises a concave structure having a first protrusion and a second protrusion spaced apart, the first shaft hole is located at the first protrusion, and a side of the second protrusion facing the first protrusion has a concave hole;

the second component has a third protrusion, the second shaft hole is a through hole located in the third protrusion, the third protrusion is located between the first protrusion and the second protrusion, the first end of the rotating shaft is located inside the first protrusion, and the second end of the rotating shaft is located inside the concave hole of the second protrusion.

4. The connecting structure of claim 1, wherein the first component and the second component each have an electronic device, and the electronic device in the first component is communicatively connected to the electronic component in the second component by the transmission component.

5. The connecting structure of claim 1, wherein the cavity is a through hole running through a first end and a second end of the rotating shaft.

6. The connecting structure of claim 1, wherein the transmission component comprises a transmission cable or a flexible circuit assembly.

7. The connecting structure of claim 6, wherein the flexible circuit assembly comprises a circuit bracket and a flexible circuit;

the circuit bracket comprises a first bracket segment and a second bracket segment connected to each other, the first bracket segment is located within the cavity, the second bracket segment extends from the cavity into the second accommodating space;

the flexible circuit is fixed on the circuit bracket and extends from the first accommodating space to the second accommodating space.

8. The connecting structure of claim 7, wherein, a portion of the flexible circuit located outside the rotating shaft and inside the first component extends into the first accommodating space after surrounding at least one circle about an axial direction of the rotating shaft.

9. The connecting structure of claim 1, wherein, a surface of the first component is concaved to form the first accommodating space, and the first shaft hole is located on a concave bottom surface of the first accommodating space;

the connecting structure further comprises a capping component for sealing the first accommodating space.

10. A wearable electronic device comprising a connecting structure of first component having a first accommodating space and a first shaft hole in communication with each other;

a second component having a second accommodating space and a second shaft hole in communication with each other;

a rotating shaft inserted into the first shaft hole and the second shaft hole, the first component and the second component being rotatably connected by the rotating shaft, a first end of the rotating shaft being located inside the first component, the rotating shaft having a cavity opened on an end face of the first end and in communication with the first accommodating space, a side wall of the rotating shaft having a first opening in communication with the cavity and the second accommodating space;

a transmission component having an end fixed in the second accommodating space and the other end extending from the second accommodating space to the first accommodating space through the first opening and the cavity and fixed in the first accommodating space;

wherein the first opening is a slot extending from the first end of the rotating shaft to a second end of the rotating shaft.

11. The wearable electronic device of claim 10, wherein, the rotating shaft is in interference fit with the second shaft hole, and the rotating shaft is in clearance fit with the first shaft hole.

12. The wearable electronic device of claim 10, wherein, the first component comprises a concave structure having a first protrusion and a second protrusion spaced apart, the first shaft hole is located at the first protrusion, and a side of the second protrusion facing the first protrusion has a concave hole;

the second component has a third protrusion, the second shaft hole is a through hole located in the third protrusion, the third protrusion is located between the first protrusion and the second protrusion, the first end of the rotating shaft is located inside the first protrusion, and the second end of the rotating shaft is located inside the concave hole of the second protrusion.

13. The wearable electronic device of claim 10, wherein the first component and the second component each have an electronic device, and the electronic device in the first component is communicatively connected to the electronic component in the second component by the transmission component.

14. The wearable electronic device of claim 10, wherein the cavity is a through hole running through a first end and a second end of the rotating shaft.

15. The wearable electronic device of claim 10, wherein the transmission component comprises a transmission cable or a flexible circuit assembly.

16. The wearable electronic device of claim 15, wherein the flexible circuit assembly comprises a circuit bracket and a flexible circuit;

the circuit bracket comprises a first bracket segment and a second bracket segment connected to each other, the first bracket segment is located within the cavity, the second bracket segment extends from the cavity into the second accommodating space;

the flexible circuit is fixed on the circuit bracket and extends from the first accommodating space to the second accommodating space.

17. The wearable electronic device of claim 16, wherein, a portion of the flexible circuit located outside the rotating shaft and inside the first component extends into the first accommodating space after surrounding at least one circle about an axial direction of the rotating shaft.

18. The wearable electronic device of claim 10, wherein, a surface of the first component is concaved to form the first accommodating space, and the first shaft hole is located on a concave bottom surface of the first accommodating space;

the connecting structure further comprises a capping component for sealing the first accommodating space.

* * * * *